(12) United States Patent
Kwon et al.

(10) Patent No.: US 9,826,580 B2
(45) Date of Patent: Nov. 21, 2017

(54) BACKLIGHT UNIT

(71) Applicant: SAMSUNG DISPLAY CO., LTD., Yongin-si, Gyeonggi-do (KR)

(72) Inventors: Youngsup Kwon, Gwangmyeong-si (KR); Byungkyou Min, Seoul (KR); Jinwon Jang, Asan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/197,182

(22) Filed: Jun. 29, 2016

(65) Prior Publication Data

US 2017/0150557 A1    May 25, 2017

(30) Foreign Application Priority Data

Nov. 19, 2015 (KR) ........................ 10-2015-0162267

(51) Int. Cl.
| | |
|---|---|
| *H05B 37/00* | (2006.01) |
| *H05B 39/00* | (2006.01) |
| *H05B 41/14* | (2006.01) |
| *H05B 33/08* | (2006.01) |
| *F21V 8/00* | (2006.01) |
| *H01F 27/28* | (2006.01) |

(52) U.S. Cl.
CPC ....... *H05B 33/0806* (2013.01); *G02B 6/0055* (2013.01); *G02B 6/0073* (2013.01); *G02B 6/0083* (2013.01); *G02B 6/0088* (2013.01); *H01F 27/2804* (2013.01); *H01F 2027/2809* (2013.01)

(58) Field of Classification Search
None
See application file for complete search history.

(56) References Cited

U.S. PATENT DOCUMENTS

| | | | | |
|---|---|---|---|---|
| 4,601,765 A | * | 7/1986 | Soileau | H01F 41/0246 148/104 |
| 4,881,011 A | * | 11/1989 | Britton | H05B 41/2925 315/209 SC |
| 7,427,909 B2 | | 9/2008 | Ono et al. | |
| 2008/0067944 A1 | * | 3/2008 | Wang | H05B 41/2822 315/185 R |
| 2009/0108979 A1 | | 4/2009 | Kosugi et al. | |
| 2014/0070916 A1 | | 3/2014 | Odahara | |
| 2014/0375413 A1 | | 12/2014 | Kim et al. | |

FOREIGN PATENT DOCUMENTS

| | | |
|---|---|---|
| JP | 05-304035 | 11/1993 |
| JP | 4711593 | 4/2011 |
| KR | 10-1165837 | 7/2012 |

OTHER PUBLICATIONS

European Search Report dated Mar. 14, 2017.

\* cited by examiner

*Primary Examiner* — Anh Tran
(74) *Attorney, Agent, or Firm* — F. Chau & Associates, LLC

(57) ABSTRACT

A backlight unit includes a light source; and a light-source driving unit configured to drive the light source and that includes a transformer. The transformer includes a core comprising a plurality of metal powders; and a plurality of coils embedded in the core. At least one coil has a diameter different from a diameter of another coil.

19 Claims, 13 Drawing Sheets

BACKLIGHT UNIT

CROSS-REFERENCE TO RELATED APPLICATION

This application claims priority under 35 U.S.C. §119 from, and the benefit of, Korean Patent Application No. 10-2015-0162267, filed on Nov. 19, 2015 in the Korean Intellectual Property Office, the contents of which are herein incorporated by reference in their entirety.

BACKGROUND

1. Technical Field

Embodiments of the present disclosure are directed to a backlight unit with a slim structure.

2. Discussion of the Related Art

A liquid crystal display (LCD) is a type of flat panel displays (FPDs) that is currently widely used. An LCD device generally includes two substrates that include field-generating electrodes, such as a pixel electrode and a common electrode, and a liquid crystal layer interposed therebetween. Upon applying voltage to the field-generating electrodes, the LCD device rearranges liquid crystal molecules of the liquid crystal layer to control an amount of light passing therethrough.

An LCD device includes a backlight unit. A backlight unit can be classified as a direct type, an edge type, and a corner type, based on a position of the light sources.

Recently, light emitting diodes ("LEDs"), in which have low-power consumption and high efficiency, have become more widely used as a light source of the backlight unit.

A backlight unit may include a light source module that includes a plurality of LEDs mounted on a single printed circuit board ("PCB").

The LEDs are disposed on a light-source circuit board. A width of the light-source circuit board can affect a size of the backlight unit.

SUMMARY

Embodiments of the present disclosure can provide a backlight unit that includes a light-source circuit board with a reduced width, thus enabling a slimmer structure for a display device.

According to an exemplary embodiment of the present disclosure, a backlight unit includes a light source; and a light-source driving unit configured to drive the light source and that includes a transformer. The transformer includes a core comprising a plurality of metal powders; and a plurality of coils embedded in the core. At least one coil has a diameter different from a diameter of another coil.

The at least one metal powder may include metal particles and an insulator surrounding the metal particles.

The at least one metal powder may include at least one of iron, cobalt, and nickel.

The core may surround the plurality of coils. The core may include a coil portion around which each of the plurality of coils is rolled and a case portion that surrounds the plurality of coils.

The coil portion and the case portion may be formed as one unit.

A plurality of coils with a smaller diameter may be rolled around the core more times than a plurality of coils with a larger diameter.

According to an exemplary embodiment of the present disclosure, a backlight unit includes a light source; and a light-source driving unit configured to drive the light source and that includes a transformer. The transformer includes a core comprising a plurality of metal powders; a plurality of substrates, each having an insertion hole into which the core is inserted; and a plurality of coil patterns on respective substrates of the plurality of substrates, each coil pattern surrounding the core. At least one coil pattern has a width different from a width of another coil pattern.

At least one metal powder may include metal particles and an insulator surrounding the metal particles.

At least one metal powder may include at least one of iron, cobalt, and nickel.

The core may surround the plurality of substrates. The core may include a coil portion that is inserted into the insertion holes of the plurality of substrates; and a case portion that surrounds the plurality of substrates.

The coil portion and the case portion may be formed as one unit.

A plurality of coil patterns with a smaller diameter may be rolled around the core more times than a plurality of coils with a larger width.

According to an exemplary embodiment of the present disclosure, a light-source driving unit for driving a light source includes a transformer. The transformer includes a core comprising a plurality of metal powders; and a plurality of coils that surround the core. At least one coil has a characteristic dimension different from a characteristic dimension of another coil, and at least one metal powder comprises at least one of iron, cobalt, and nickel.

The light-source driving unit may further include a plurality of substrates, each having an insertion hole into which the core is inserted. Each of the plurality of coil patterns is disposed on a respective substrate of the plurality of substrates, and the characteristic dimension of a coil may be a width.

The core may surround the plurality of coils, and the core may further include a coil portion around which each of the plurality of coils is rolled; and a case portion that surrounds the plurality of coils.

Each of the plurality of coils may be embedded in the core, and the characteristic dimension of a coil may be a diameter.

The core may surround the plurality of substrates, and the core may further include a coil portion that is inserted into the insertion holes of the plurality of substrates; and a case portion that surrounds the plurality of substrates.

At least one metal powder may include metal particles and an insulator surrounding the metal particles, and the metal particles may include at least one of iron, cobalt, and nickel.

A plurality of coils with a smaller characteristic dimension may be rolled around the core more times than a plurality of coils with a larger characteristic dimension.

The foregoing is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
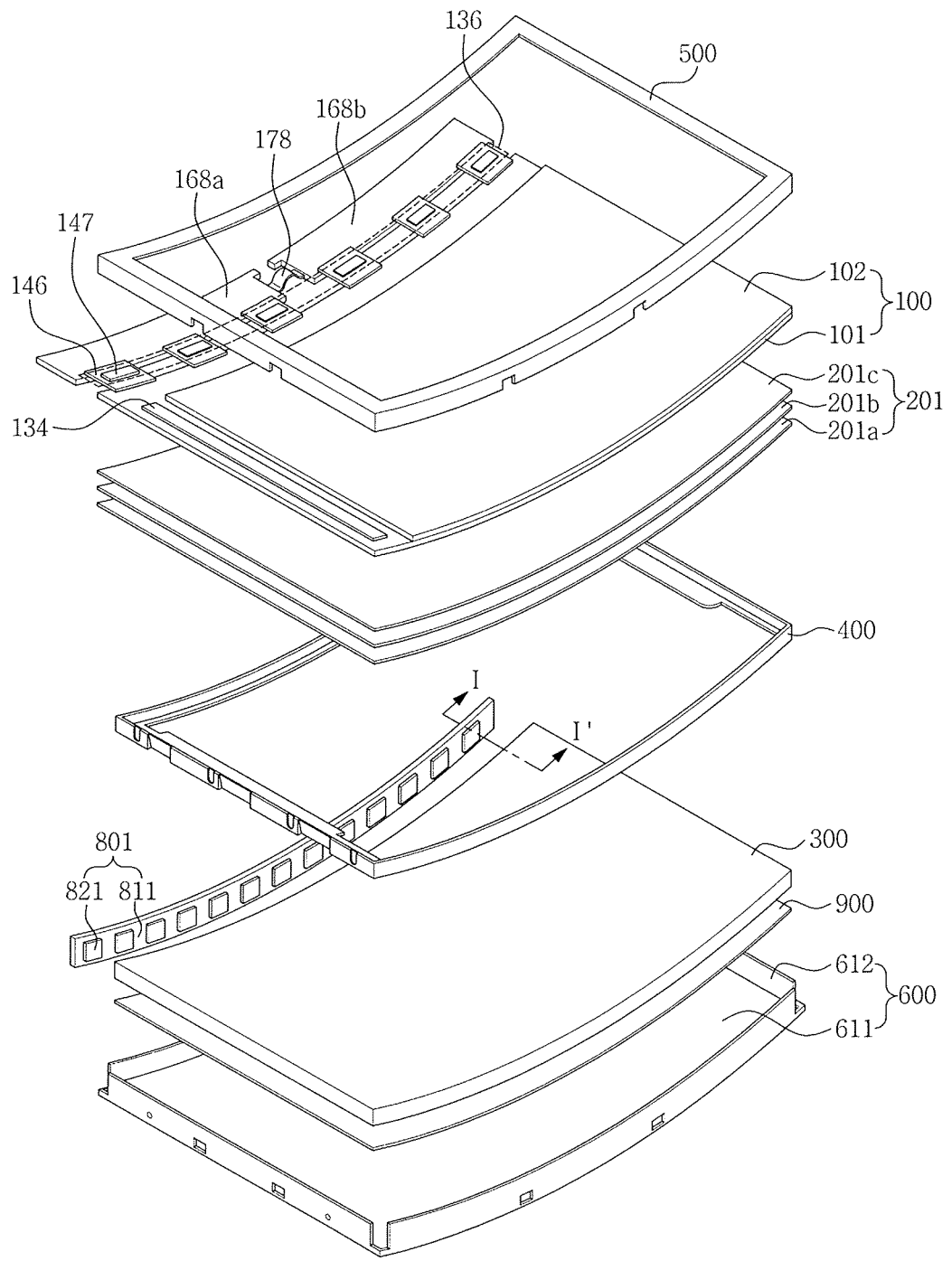
FIG. 1 is an exploded perspective view that illustrates a display device according to an exemplary embodiment.

Features of the present disclosure and methods for achieving them will be made clear from embodiments described below in detail with reference to the accompanying drawings. The present disclosure may, however, be embodied in many different forms and should not be construed as being limited to the embodiments set forth herein. Well-known constituent elements, operations and techniques may not be described in detail in the embodiments In the drawings, thicknesses may be exaggerated to clearly describe a plurality of layers and areas. Like reference numbers may be used to denote like elements throughout the specification. When an element or layer is referred to as being "on", "engaged to", "connected to" or "coupled to" another element or layer, it may be directly on, engaged, connected or coupled to the other element or layer, or intervening elements or layers may be present.

Throughout the specification, when an element is referred to as being "connected" to another element, the element is "directly connected" to the other element, or "electrically connected" to the other element with one or more intervening elements interposed therebetween.

Hereinafter, a display device according to an exemplary embodiment will be described in detail with reference to FIGS. 1 to 15.

Figure 2:
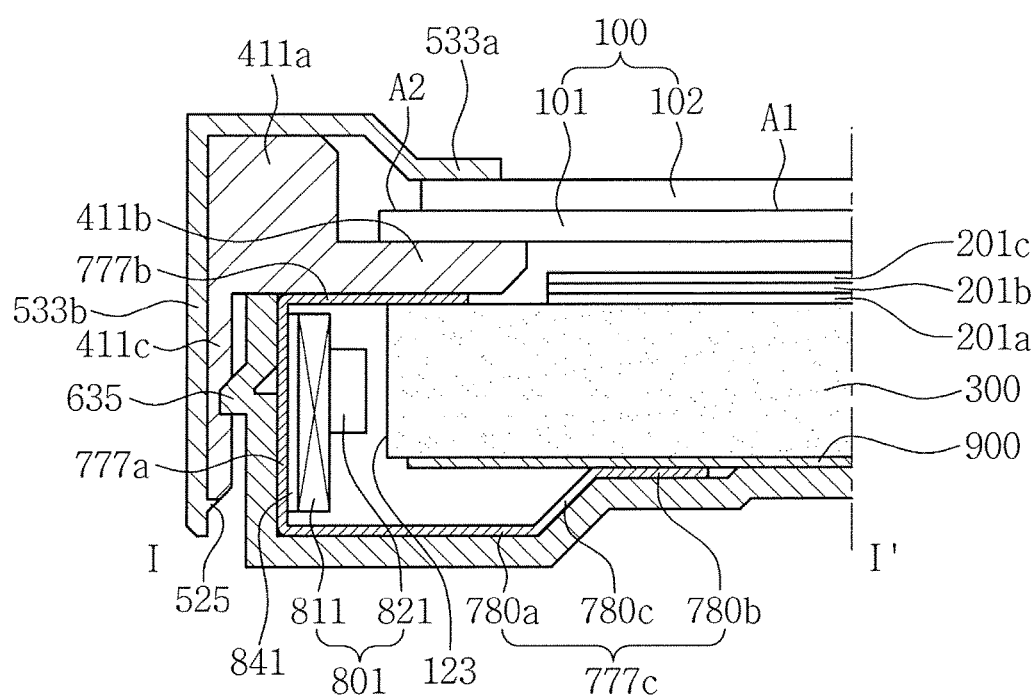
FIG. 2 is a cross-sectional view taken along line I-I' of FIG. 1.
Figure 3:
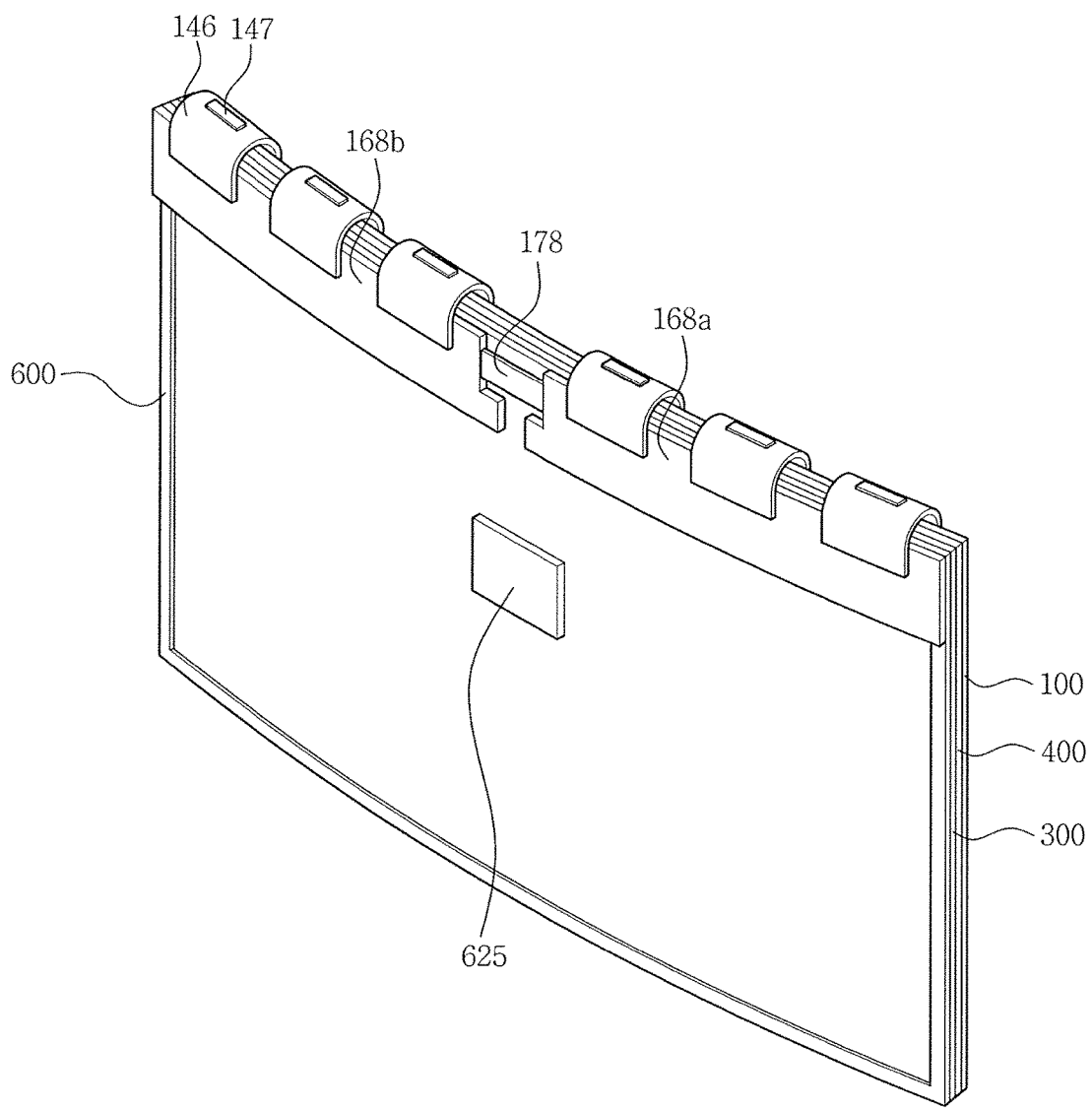
FIG. 3 illustrates a rear portion of a lower frame of FIG. 1.

FIG. 1 is an exploded perspective view that illustrates a display device according to an exemplary embodiment, FIG. 2 is a cross-sectional view taken along line I-I' of FIG. 1, and FIG. 3 illustrates a rear portion of a lower frame 600 of FIG. 1.

A display device according to an exemplary embodiment, as illustrated in FIGS. 1, 2, and 3, includes the lower frame 600, a reflection sheet 900, a light guide plate 300, an optical sheet 201, a light source unit 801, a light source cover 701, an intermediate frame 400, a display panel 100, an upper frame 500, and a light-source driving unit 625.

A display device according to an exemplary embodiment may be curved. The above-listed elements of the display device may be curved to correspond to a curved shape of the display device.

According to an embodiment, the reflection sheet 900, the light guide plate 300, the optical sheet 201, the light source unit 801, the light source cover 701, the intermediate frame 400, and the light-source driving unit 625 are included in a backlight unit. In such an exemplary embodiment, the display panel 100 and the backlight unit are assembled into a stacked structure that constitutes a display module. The display module may further include the upper frame 500 and the lower frame 600 to protect and fix the display panel 100 and the backlight unit and a driving circuit board that drives the display panel 100.

According to an embodiment, the lower frame 600 has an accommodation space therein. The reflection sheet 900, the light guide plate 300, the optical sheet 201, the light source unit 801, and the light source cover 701 can be disposed in the accommodation space. To secure the accommodation space, the lower frame 600 includes a base portion 611 and a plurality of side portions 612. In an exemplary embodiment, the base portion 611 has a rectangular shape, and the side portions 612 protrude from edges of the base portion 611, respectively, to a predetermined height. Edges of the side portions 612 that are adjacent to each other are connected to each other. A space surrounded and defined by the side portions 612 and the base portion 611 corresponds to the aforementioned accommodation space. In an exemplary embodiment, a locking projection 635 is formed on an exterior side of at least one of the side portions 612, and the intermediate frame 400 can be fixed to the lower frame 600 by the locking projection 635. In an exemplary embodiment, a portion of one of the side portions 612 is bent to protrude toward the intermediate frame 400, thus forming the locking projection 635.

According to an embodiment, the light source unit 801 can emit light. The light emitted by the light source unit 801 is transmitted to the display panel 100 through the light guide plate 300 and the optical sheet 201. In an exemplary embodiment, the light source unit 801 includes a light-source circuit board 811 and at least one light source 821. A surface of the light-source circuit board 811 is divided into at least one mounting area and a wiring area. If two or more light sources 821 are provided, the light sources 821 are disposed on each corresponding mounting areas, respectively, and a plurality of wirings for transmitting a light-source driving voltage to the light sources 821 are provided in the wiring area. The aforementioned light-source driving voltage is generated by the light-source driving unit 625, and then transmitted to the plurality of wirings through a separate connector.

According to an embodiment, the light source 821 is a light emission package that includes at least one light emitting diode ("LED"). In an exemplary embodiment, a light emission package includes therein a red LED that emits red light, a green LED that emits green light, and a blue LED that emits blue light. The light emission package combines the three colors to generate white light. In an alternative exemplary embodiment, the light emission package includes only a blue LED of the aforementioned three LEDs therein, and in such an exemplary embodiment, a phosphor that converts blue light into white light is formed inside a light emission unit of the blue LED. Light emitted from the light source 821 propagates to the light guide plate 300.

According to an embodiment, the light guide plate 300 can guide light received from the light source unit 801 to the display panel 100. The light guide plate 300, as illustrated in FIGS. 1 and 2, has a curved polyhedral shape. One surface of the light guide plate 300 faces the light source 821 and is defined as a light incident surface 123. The light incident surface 123 has a rounded curved shape that is concave downward toward the accommodation space of the lower frame 600. Light emitted from the light source 821 is incident to the light incident surface 123, and propagates toward the inside of the light guide plate 300. The light guide plate 300 totally reflects the light incident thereinside toward a display area of the display panel 100. In an exemplary embodiment, a plurality of scattering patterns can be further disposed on a lower exterior surface of the light guide plate 300 to improve the reflectivity of the light guide plate 300.

According to an embodiment, the light guide plate 300 includes or is formed of a light transmissive material, including acrylic resins such as polymethyl methacrylate (PMMA) and polycarbonate (PC), to efficiently guide light.

According to an embodiment, the reflection sheet 900 is disposed between the light guide plate 300 and the lower frame 600. The reflection sheet 900 re-reflects light that has propagated through the lower exterior surface of the light guide plate 300 back toward the light guide plate 300, thereby minimizing light attenuation.

According to an embodiment, the optical sheet 201 can diffuse and collimate light received from the light guide plate 300. The optical sheet 201 is disposed between the light guide plate 300 and the display panel 100. The optical sheet 201 includes a diffusion sheet 201a, a light collimation sheet 201b, and a passivation sheet 201c. The diffusion sheet 201a, the light collimation sheet 201b, and the passivation sheet 201c are sequentially stacked on the light guide plate 300 in the order listed.

According to an embodiment, the diffusion sheet 201a diffuses light received from the light guide plate 300 to prevent concentration of the light.

According to an embodiment, the light collimation sheet 201b is disposed on the diffusion sheet 201a, and collimates light received from the diffusion sheet 201a toward a direction perpendicular to the display panel 100. To this end, prisms having a triangular cross-section are arranged in a predetermined arrangement on one surface of the light collimation sheet 201b.

According to an embodiment, the passivation sheet 201c is disposed on the collimation sheet 201b, and protects a surface of the light collimation sheet 201b and diffuses light to achieve a more uniform light distribution. The light transmitted through the passivation sheet 201c is directed toward the display panel 100.

According to an embodiment, the light source cover 701 surrounds a side of the light guide plate 300 to accommodate the light source unit 801 and the light incident surface 123 of the light guide plate 300 within the accommodation space therein. The light source cover 701 aligns the light sources 821 on the light incident surface 123 so that the light emitted from the light sources 821 is accurately irradiated to the light incident surface 123 of the light guide plate 300. The light source cover 701 may include or be formed of a metal, such as stainless steel.

According to an embodiment, the light source cover 701 includes a light-source embedding portion 777a, an upper cover 777b, and a lower cover 777c. The light-source embedding portion 777a faces the light source unit 801. The upper cover 777b extends from an edge of the light-source embedding portion 777a along an upper exterior surface of the light guide plate 300. The lower cover 777c extends from another edge of the light-source embedding portion 777a toward the lower exterior surface of the light guide plate 300. The lower cover 777c may have any suitable shape based on a shape of the base portion 611 of the lower frame 600. In an exemplary embodiment, as illustrated in FIG. 2, the lower cover 777c may include a first horizontal portion 780a extending from the side of the light-source embedding portion 777a for a predetermined distance, a second horizontal portion 780b disposed more adjacent to the lower surface of the light guide plate 300 than is the first horizontal portion 780a, and an inclined portion 780c connecting the first horizontal portion 780a and the second horizontal portion 780b.

According to an embodiment, the light source 821 and the light-source circuit board 811 are disposed in a space surrounded by the light-source embedding portion 777a, the upper cover 777b, and the lower cover 777c. In such an exemplary embodiment, a heat dissipation plate 841 is disposed between the light-source circuit board 811 and the light-source embedding portion 777a. Heat generated from the light source 821 can be dissipated externally through the heat dissipation plate 841.

According to an embodiment, the intermediate frame 400 is disposed between the light guide plate 300 and the optical sheet 201. The intermediate frame 400 supports the display panel 100 and the upper frame 500 while being fixed to the lower frame 600, and maintains a uniform gap between the display panel 100 and the optical sheet 201. To this end, the intermediate frame 400 may have a rectangular frame shape that includes a first supporting portion 411a, a second supporting portion 411b, and a fixing portion 411c.

According to an embodiment, the first supporting portion 411a is disposed over the plurality of side portions 612 to support the upper frame 500, which covers the first supporting portion 411a from thereabove.

According to an embodiment, the second supporting portion 411b extends from an interior side of the first supporting portion 411a toward the optical sheet 201. The second supporting portion 411b has a height less than a height of the first supporting portion 411a. A height difference between the first supporting portion 411a and the second supporting portion 411b produces a space between the upper frame 500 and the second supporting portion 411b, and an edge portion of the display panel 100 is disposed in that space.

According to an embodiment, the fixing portion 411c extends from a lower surface of the first supporting portion 411a toward the side portions 612 of the lower frame 600. An engagement groove is defined at an interior side surface of the fixing portion 411c facing the locking projection 635. As the locking projection 635 is engaged with the engagement groove, the intermediate frame 400 may be fixed to the lower frame 600.

According to an embodiment, the upper frame 500 has a rectangular frame shape having an opening defined in the center portion thereof. The upper frame 500 is disposed on the display panel 100. A display area A1 of the display panel 100 is exposed through the opening of the upper frame 500. The upper frame 500 covers an edge portion of the display panel 100, an upper surface and a side surface of the first supporting portion 411a, and a side surface of the fixing portion 411c. To this end, the upper frame 500 includes a front cover 533a that covers the edge portion of the display panel 100 and the upper surface of the first supporting portion 411a, and a side cover 533b that covers the side surface of the first supporting portion 411a and the side surface of the fixing portion 411c.

In an exemplary embodiment, a hook 525 may be disposed at an interior side surface of the side cover 533*b*, and the hook 525 contacts a lower surface of the fixing portion 411*c* of the intermediate frame 400. The upper frame 500 can be fixed to the intermediate frame 400 by the hook 525. In addition, one of the side covers 533*b* may have an aperture. A printed circuit board ("PCB") 168 to be described below is externally exposed through the aperture of the side cover 533*b*.

According to an embodiment, the display panel 100 can display an image. The display panel 100 includes a lower panel 101 and an upper panel 102 that opposes the lower panel 101.

According to an embodiment, the lower panel 101 has an area larger than an area of the upper panel 102. The lower panel 101, as illustrated in FIG. 2, is divided into a display area A1 and a non-display area A2, and the display area A1 of the lower panel 101 and the upper panel 102 face each other. The display area A1 has an area substantially the same as an area of the upper panel 102, since the width of the portion of the upper panel 102 that is overlapped by the front cover 533*a* of the upper frame 500, as shown in FIG. 2, is negligible as compared to an overall size of the upper panel 102.

According to an embodiment, a light control layer is disposed between the display area A1 of the lower panel 101 and the upper panel 102, and any suitable element that may control transmittance of light emitted from the backlight unit may be used as the light control layer. In an exemplary embodiment, the light control layer may be one of a liquid crystal layer, an electro-wetting layer, and an electrophoretic layer.

According to an embodiment, the lower panel 101 includes a plurality of gate lines, a plurality of data lines, and a lower polarizer. The data lines intersect the gate lines. The gate lines extend toward the non-display area A2 to be connected to a gate driver 134, and the data lines extend toward the non-display area A2 to be connected to a data driver 136.

According to an embodiment, the gate driver 134 is disposed in the non-display area A2 of the lower panel 101. The gate driver 134 generates gate signals based on a gate control signal received from a timing controller, and sequentially transmits the gate signals to the plurality of gate lines. The gate driver 134 may include, for example, a shift register that shifts a gate start pulse based on a gate shift clock to produce gate signals. The shift register may include a plurality of driving transistors.

The data driver 136 includes a plurality of data driving integrated circuits ("ICs") 147. The data driving ICs 147 receive a digital image data signal and a data control signal applied thereto from the timing controller. The data driving ICs 147 sample the digital image data signals according to the data control signal, latch the sampled image data signals corresponding to one horizontal line every horizontal period, and transmit the latched image data signals to the data lines. That is, the data driving ICs 147 convert the digital image data signals received from the timing controller into analog image signals using a gamma voltage received from a power supply, and transmit the analog image signals to the data lines.

According to an embodiment, each data driving IC 147 is mounted on a corresponding carrier 146. Some of the carriers 146 are connected between a first data circuit board 168*a* and the display panel 100, and some of other carriers 146 are connected between a second data circuit board 168*b* and the display panel 100.

The first data circuit board 168*a* and the second data circuit board 168*b* are electrically connected to each other by a connecting portion 178. The connecting portion 178 may be a flexible printed circuit board (FPCB).

According to an embodiment, the aforementioned timing controller and power supply are disposed on one of the first data circuit board 168*a* and the second data circuit board 168*b*. If the timing controller and power supply are disposed on the first data circuit board 168*a*, signals received from the timing controller and power supply are transmitted to the second data circuit board 168*b* through the connecting portion 178. In an alternative exemplary embodiment, if the timing controller and power supply are disposed on the second data circuit board 168*b*, signals received from the timing controller and power supply are transmitted to the first data circuit board 168*a* through the connecting portion 178. In an alternative exemplary embodiment, the timing controller and power supply can be disposed on different data circuit boards, respectively.

According to an embodiment, the carrier 146 includes input wirings that transmit various signals received from the timing controller and the power supply to the data driving IC 147 and output wirings that transmit image data signals output from the data driving IC 147 to corresponding data lines. In an exemplary embodiment, at least one carrier 146 further includes auxiliary wirings connected to panel wirings disposed in the lower panel 101 that transmit various signals received from the timing controller and the power supply to the gate driver 134. The panel wirings connect the auxiliary wirings and the gate driver 134 to each other. The panel wirings may be formed on the lower panel 101 in a line-on-glass manner.

According to an embodiment, the upper panel 102 includes a common electrode, a shielding layer, and an upper polarizer. A transmission axis of the upper polarizer is perpendicular to a transmission axis of the lower polarizer.

According to an embodiment, the light-source driving unit 625, as illustrated in FIG. 3, is disposed on a rear surface of the lower frame 600. The light-source driving unit 625 generates a light source driving voltage used for operation of the light sources 821.

Figure 4:
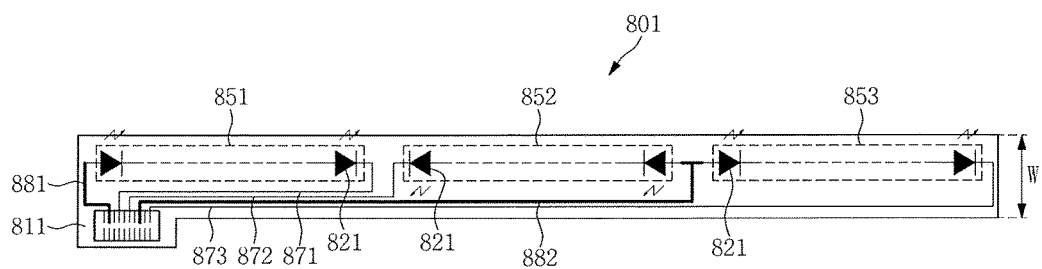
FIG. 4 illustrates an equivalent light source circuit of a light source unit of FIG. 1.

FIG. 4 illustrates an equivalent circuit of the light sources 821 of the light source unit 801 of FIG. 1.

According to an embodiment, the light sources 821 can be divided into a plurality of light source strings, and in an exemplary embodiment, as illustrated in FIG. 4, the light sources 821 are divided into first, second, and third light source strings 851, 852, and 853. The first, second, and third light source strings 851, 852, and 853 are connected to high-voltage lines 881 and 882 in common, and connected to low-voltage lines individually. In an exemplary embodiment, the first, second, and third light source strings 851, 852, and 853 are connected to the high-voltage lines 881 and 882 in common, and the first, second, and third light source strings 851, 852, and 853 are connected to the first, second, and third low-voltage lines 871, 872, and 873, respectively. In an exemplary embodiment, as illustrated in FIG. 4, two high-voltage lines 881 and 882 are provided so that the high-voltage lines 881 and 882 do not intersect the first, second, and third low-voltage lines 871, 872, and 873. However, the two high-voltage lines 881 and 882 have an equal electric potential. In an exemplary embodiment, a same light-source driving voltage is applied to the high-voltage lines 881 and 882.

According to an embodiment, if the number of light source strings increases, the number of light sources that can be disposed in each light source string relatively decreases, thus requiring a relatively lower light-source driving voltage, but the number of low-voltage lines increases, which can increase a width W of the light-source circuit board 811. In an alternative exemplary embodiment, if the number of light source strings decreases, the number of light sources that can be disposed in each light source string relatively increases, thus requiring a relatively higher light-source driving voltage, but the number of low-voltage lines decreases, which decreases the width W of the light-source circuit board 811. The width W of the light-source circuit board 811 affects a size of the backlight unit.

Figure 5:
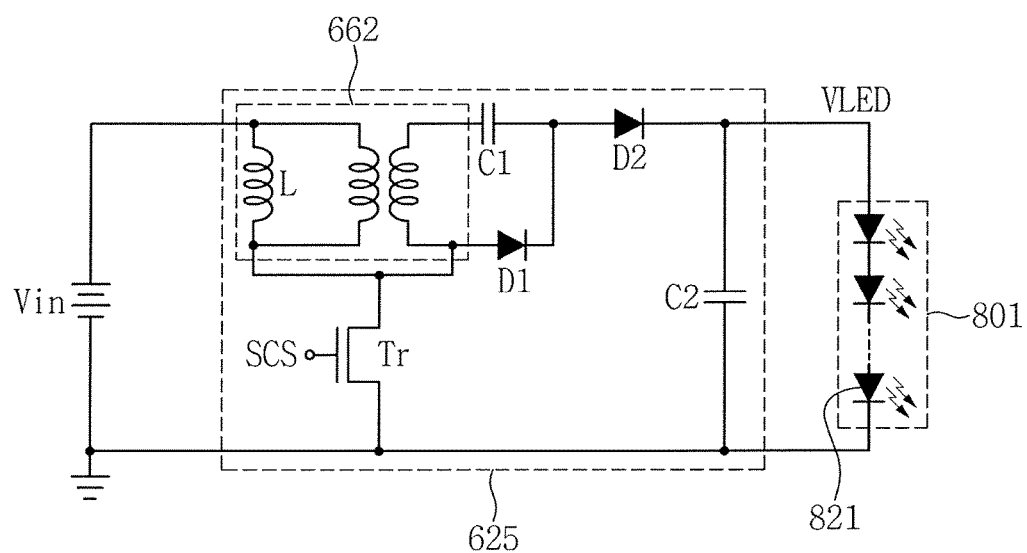
FIG. 5 illustrates a configuration of a light-source driving unit of FIG. 1.
Figure 6:
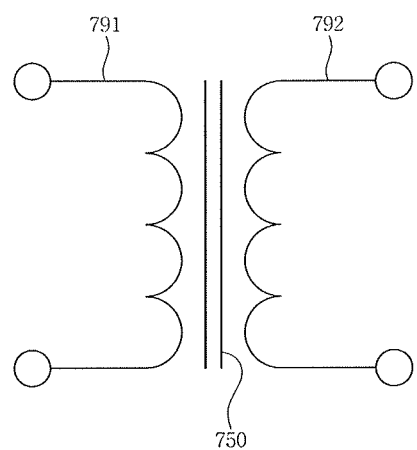
FIG. 6 is a mimetic view that illustrates a transformer of FIG. 5.

FIG. 5 illustrates a configuration of the light-source driving unit 625 of FIG. 1, and FIG. 6 is a mimetic view that illustrates a transformer 662 of FIG. 5.

According to an embodiment, the light-source driving unit 625, as illustrated in FIG. 5, includes the transformer 662, an output control switching element Tr, a first diode D1, a second diode D2, a first capacitor C1, and a second capacitor C2.

According to an embodiment, the transformer 662 increases a level of an input voltage Vin received from the power supply to output the input voltage Vin.

The output control switching element Tr controls an output from the transformer 662 based on an externally received switching control signal SCS. An output level from the transformer 662 varies based on a duty ratio of the switching control signal SCS.

The first diode D1 and the second diode D2 can prevent a current back flow.

The first capacitor C1 and the second capacitor C2 can store the output from the transformer 662. The voltage stored in the second capacitor C2 is transmitted to the light source 821 as a light-source driving voltage VLED.

In an exemplary embodiment, the transformer 662 illustrated in FIG. 5 includes an inductor L, and the inductor L is used to represent an equivalent circuit of the transformer 662. An actual transformer 662 does not include the inductor L as illustrated in FIG. 6. That is, the transformer 662, as illustrated in FIG. 6, includes a first coil 791, a second coil 792, and a core 750.

Figure 7:
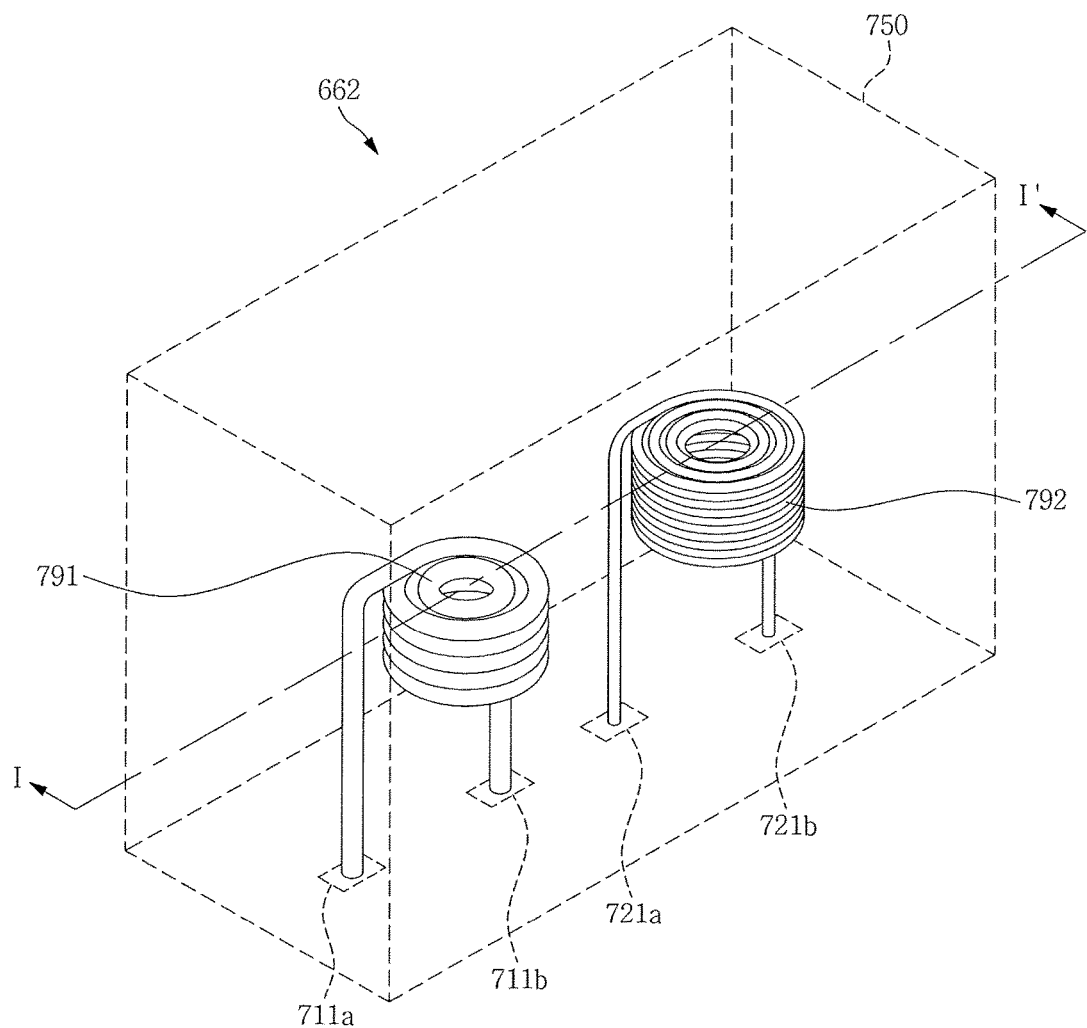
FIG. 7 illustrates a transformer according to an exemplary embodiment.
Figure 8:
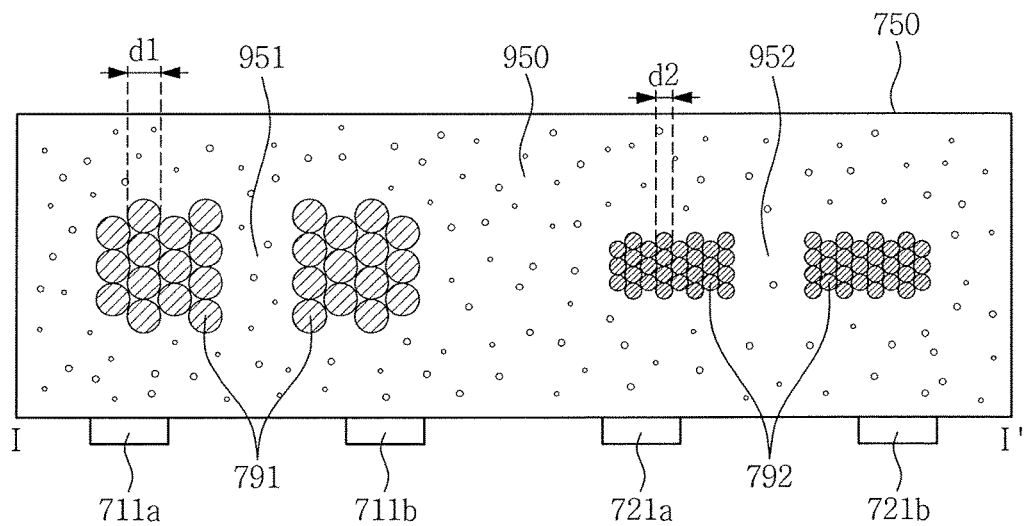
FIG. 8 is a cross-sectional view taken along line I-I' of FIG. 7.
Figure 9:
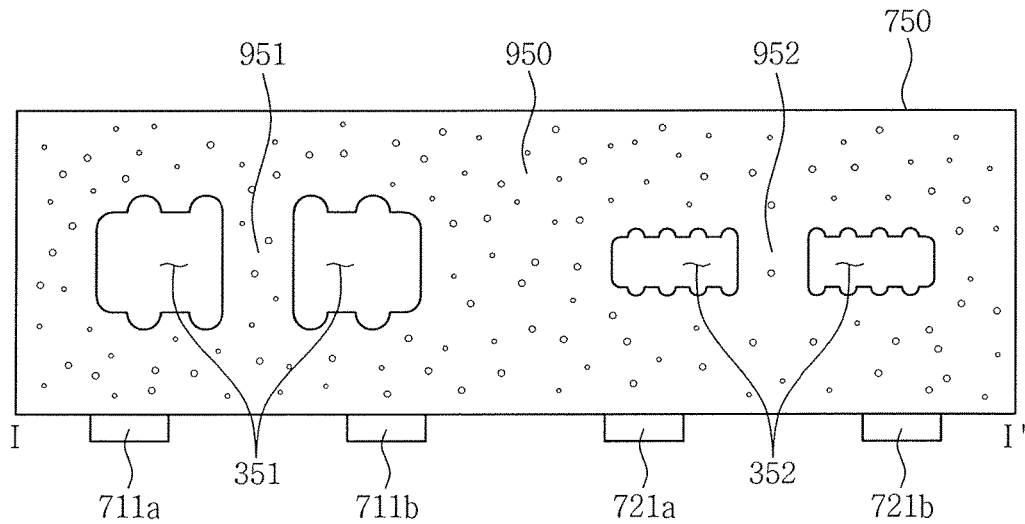
FIG. 9 is a cross-sectional view of FIG. 8 absent a first coil and a second coil.

FIG. 7 illustrates a transformer 662 according to an exemplary embodiment, FIG. 8 is a cross-sectional view taken along line I-I' of FIG. 7, and FIG. 9 is a cross-sectional view of FIG. 8 absent the first coil 791 and the second coil 792.

According to an embodiment, the transformer 662, as illustrated in FIGS. 7 and 8, includes the first coil 791, the second coil 792, a core 750, first terminals 711a and 711b, and second terminals 721a and 721b.

According to an embodiment, the core 750, as illustrated in FIG. 8, includes a first coil portion 951, a second coil portion 952, and a case portion 950. The case portion 950 connects the first coil portion 951 and the second coil portion 952. In this regard, the case portion 950 surrounds the first coil portion 951 and the second coil portion 952, and connects the first coil portion 951 and the second coil portion 952. In such an exemplary embodiment, the core 750, as illustrated in FIG. 9, has thereinside a first accommodation space 351 defined by the first coil portion 951 and the case portion 950 and a second accommodation space 352 defined by the second coil portion 952 and the case portion 950.

According to an embodiment, the first coil 791 and the second coil 792 are embedded in the core 750. In detail, the first coil 791 is disposed in the first accommodation space 351 of the core 750, and the second coil 792 is disposed in the second accommodation space 352 of the core 750.

Letting a surface of the case portion 950 contacting the first terminals 711a and 711b and the second terminals 721a and 721b be defined as a lower surface of the case portion 950, then the first coil portion 951 extends in a direction perpendicular to the lower surface of the case portion 950. Likewise, the second coil portion 952 extends in a direction perpendicular to the lower surface of the case portion 950. The first coil portion 951 is parallel to the second coil portion 952.

According to an embodiment, a portion of the first coil 791, a portion of the case portion 950, and a portion of the second coil 792 are disposed between the first coil portion 951 and the second coil portion 952.

According to an embodiment, the core 750 includes or is formed of metal. Herein, the metal may include a plurality of metal powders. In such an exemplary embodiment, at least one metal power includes metal particles and an insulator, and the insulator surrounds the metal particles. In an exemplary embodiment, the metal power does not include the insulator.

The metal forming the core 750 may include at least one selected from iron, cobalt, and nickel.

The metal particles forming the core 750 may include at least one selected from iron, cobalt, and nickel.

A metal such as iron, cobalt, and nickel has a higher permeability than that of ferrite. Accordingly, the transformer 662, including the core 750 that includes iron, can generate a higher voltage than a conventional transformer that includes a ferrite core. Accordingly, if the transformer 662 that includes the iron-containing core 750 is used in the backlight unit of the display device, the number of the aforementioned light source strings can be reduced, which means that a width W of the light-source circuit board 811 can be reduced. As such, the transformer 662 that includes the iron-containing core 750 can enable a backlight unit and a display device including the backlight unit to have a slimmer structure.

The first coil 791 is rolled around the core 750. In an exemplary embodiment, the first coil 791 is rolled around the first coil portion 951 of the core 750. In such an exemplary embodiment, the first coil 791 is disposed in the aforementioned first accommodation space 351. End portions of the first coil 791 are exposed external to the core 750. One end portion of the first coil 791 is connected to one of the first terminals, for example, a first terminal 711a, and the other end portion of the first coil 791 is connected to another of the first terminals, for example, a first terminal 711b.

The second coil 792 is rolled around the core 750. In an exemplary embodiment, the second coil 792 is rolled around the second coil portion 952 of the core 750. In such an exemplary embodiment, the second coil 792 is disposed in the aforementioned second accommodation space 352. End portions of the second coil 792 are exposed external to the core 750. One end portion of the second coil 792 is connected to one of the second terminals, for example, a second terminal 721a, and the other end portion of the second coil 792 is connected to another of the second terminals, for example, a second terminal 721b.

The first coil 791 may have a diameter different from that of the second coil 792. In an exemplary embodiment, a coil with a smaller diameter is rolled around the core 750 more times than a coil with a larger diameter. In an exemplary embodiment, as illustrated in FIG. 8, the first coil 791 is rolled around the first coil portion 951 of the core 750 four times and the second coil 792 is rolled around the second coil portion 952 of the core 750 eight times, and the second coil 792 has a diameter d2 that is less than a diameter d1 of the first coil 791 (d2<d1). Accordingly, since a coil diameter decreases in proportion to the number of times the around which the coil is rolled, a size increase of the transformer 662 can be significantly mitigated, even though the number of times the coil is rolled increases.

According to an embodiment, if an input voltage Vin is applied to the first coil 791 of the transformer 662 illustrated in FIG. 8, an output voltage induced by the input voltage Vin is applied to the second coil 792. As illustrated in FIG. 8, as the second coil 792 is rolled around the core 750 a greater number of times than that of the first coil 791, the output voltage is higher than the input voltage Vin. That is, the transformer 662 illustrated in FIG. 8 can function as a step-up transformer that can boost the input voltage Vin.

Figure 10:
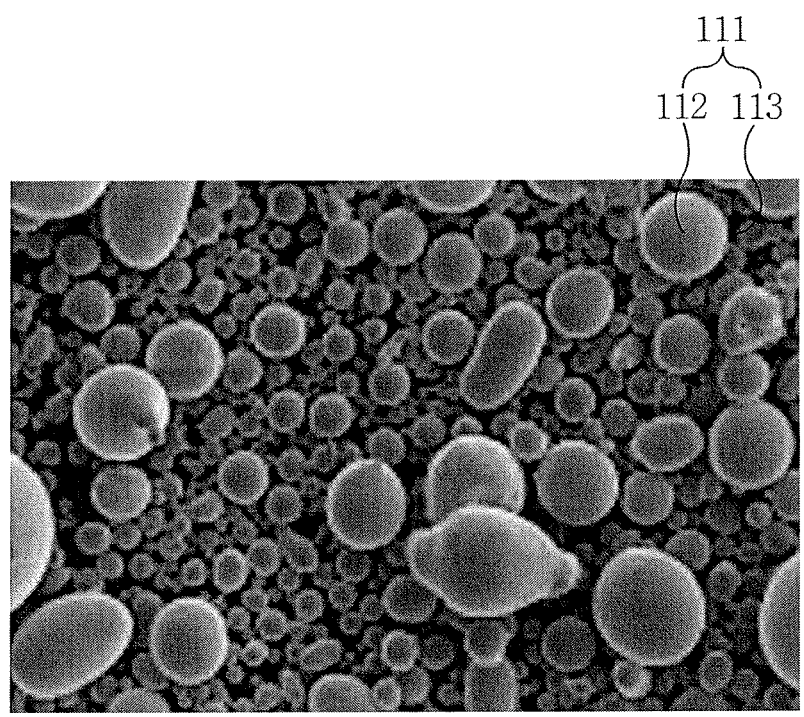
FIG. 10 illustrates an interior structure of a core of FIG. 8 observed by scanning electron microscopy (SEM).

FIG. 10 illustrates an interior structure of the core 750 of FIG. 8 observed by scanning electron microscopy (SEM).

As illustrated in FIG. 10, the core 750 includes a plurality of metal powders 111, and at least one metal powder 111 includes a metal particle 112 and an insulator 113 surrounding the metal particle 112.

According to embodiments of the disclosure, the transformer 662 illustrated in FIG. 8 can be manufactured in the following manner.

First, the first coil 791 and the second coil 792 are disposed in a mold.

Subsequently, the metal powders 111 are filled in the mold in which the first coil 791 and the second coil 792 are disposed. In an exemplary embodiment, the metal powder 111 includes the metal particles 112 that include the aforementioned iron and the insulator 113 surrounding the metal particles 112.

Subsequently, pressure and heat are applied to the metal powders 111 in the mold. In such an exemplary embodiment, the metal powders 111 combine with each other to coagulate. The coagulated metal powders 111 form the core 750, including the first coil portion 951, the second coil portion 952, and the case portion 950. The core 750 surrounds a portion of the first coil 791 and the second coil 792 aside from the end portions of the first coil 791 and the end portions of the second coil 792. In such an exemplary embodiment, the first coil 791 and the second coil 792 are rolled around the first coil portion 951 of the core 750 and the second coil portion 952 of the core 750, respectively.

According to embodiments, in the transformer 662 manufactured in such a manner, the core 750, including the metal powders 111, surrounds the entire first coil 791 and second coil 792. Accordingly, a coupling force between the first and second coils 791 and 792 and the core 750 increases, and an additional supporting member for supporting the first and second coils 791 and 792 and the core 750 is unnecessary.

Figure 11:
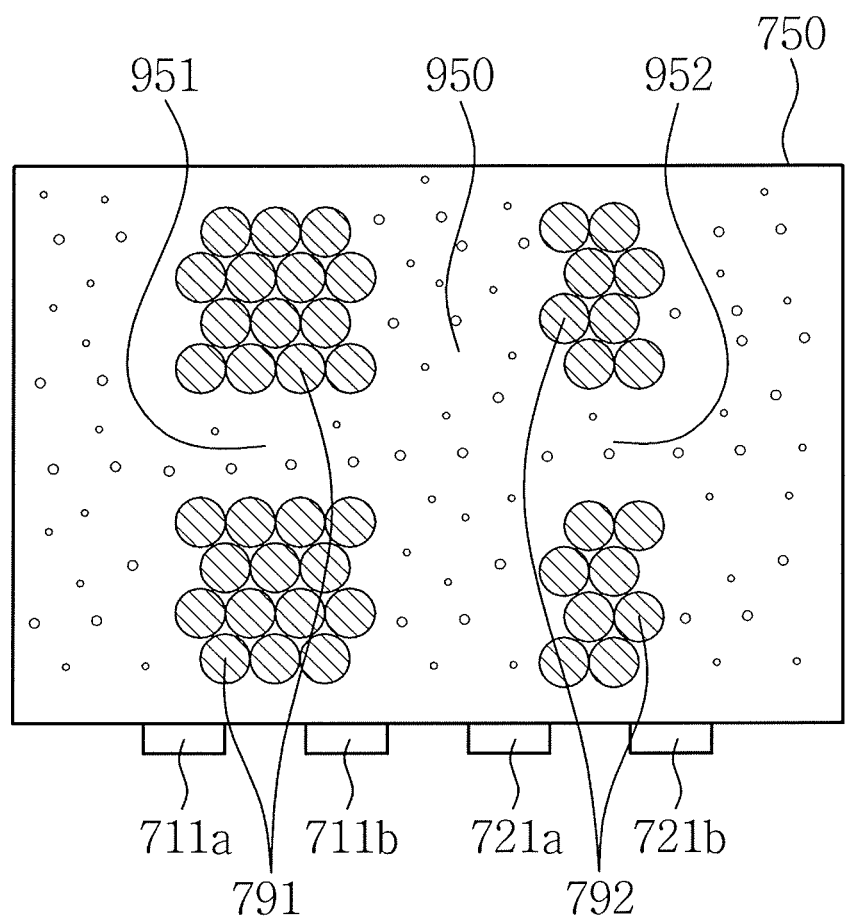
FIG. 11 illustrates a transformer according to another exemplary embodiment.

FIG. 11 illustrates a transformer 662 according to another exemplary embodiment.

The transformer 662 of FIG. 11 includes a first coil 791, a second coil 792, a core 750, first terminals 711a and 711b, and second terminals 721a and 721b.

The first coil 791, the second coil 792, the core 750, the first terminals 711a and 711b, and the second terminals 721a and 721b of the transformer 662 illustrated in FIG. 11 are the same as the first coil 791, the second coil 792, the core 750, the first terminals 711a and 711b, and the second terminals 721a and 721b of the transformer 662 illustrated in FIG. 8, and thus descriptions pertaining thereto will make reference to FIG. 8 and related descriptions.

However, the transformer 662 of FIG. 11 has the following difference compared to the transformer 662 of FIG. 8.

Letting a lower surface of a case portion 950 be defined as described hereinabove, a first coil portion 951 of FIG. 11 extends parallel to the lower surface of the case portion 950. A second coil portion 952 of FIG. 11 extends parallel to the lower surface of the case portion 950.

A portion of the case portion 950 is disposed between the first coil portion 951 and the second coil portion 952.

The first coil 791 of the transformer 662 illustrated in FIG. 11 is rolled around the core 750 a greater number of times than the second coil 792 is rolled therearound. Accordingly, the transformer 662 of FIG. 11 functions as a step-down transformer that can decrease the input voltage Vin to a voltage less than that of the input voltage Vin.

In FIG. 11, the first coil 791, which is rolled around the core 750 a greater number of times than the second coil 792, has a diameter less than a diameter of the second coil 792.

Figure 12:
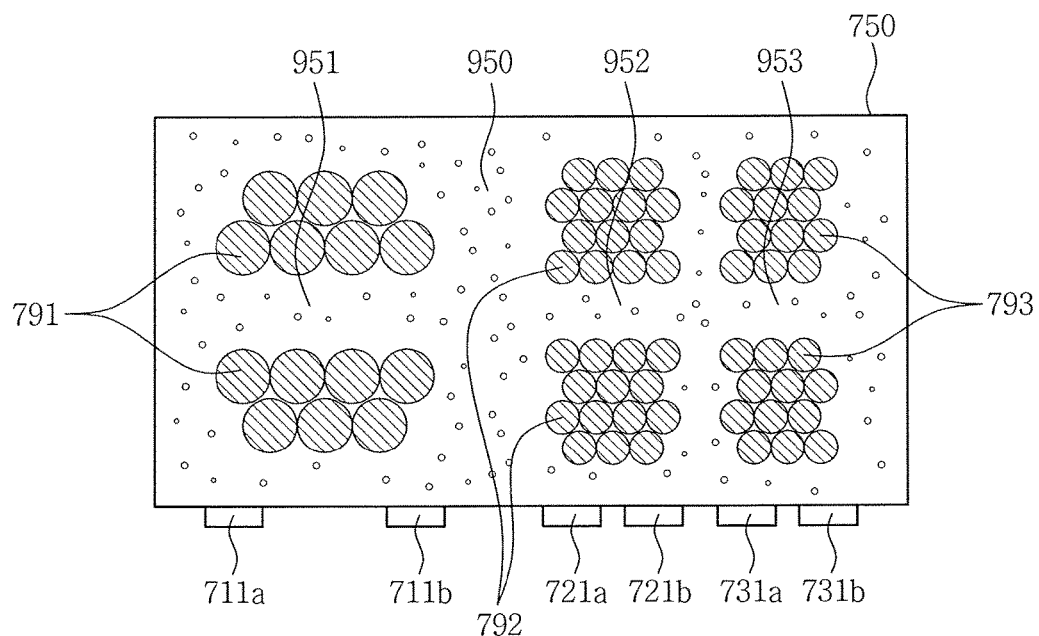
FIG. 12 is a cross-sectional view that illustrates a transformer according to still another exemplary embodiment.

FIG. 12 is a cross-sectional view that illustrates a transformer 662 according to still another exemplary embodiment.

The transformer 662 of FIG. 12 includes a first coil 791, a second coil 792, a third coil 793, a core 750, first terminals 711a and 711b, second terminals 721a and 721b, and third terminals 731a and 731b.

The core 750, as illustrated in FIG. 12, includes a first coil portion 951, a second coil portion 952, a third coil portion 953, and a case portion 950. The case portion 950 connects the first coil portion 951, the second coil portion 952, and the third coil portion 953. In such an exemplary embodiment, the case portion 950 surrounds the first coil portion 951, the second coil portion 952, and the third coil portion 953, and connects the first coil portion 951, the second coil portion 952, and the third coil portion 953. In such an exemplary embodiment, the core 750 has thereinside a first accommodation space defined by the first coil portion 951 and the case portion 950, a second accommodation space defined by the second coil portion 952 and the case portion 950, and a third accommodation space defined by the third coil portion 953 and the case portion 950.

Letting a surface of the case portion 950 contacting the first terminals 711a and 711b, the second terminals 721a and 721b, and the third terminals 731a and 731b be defined as a lower surface of the case portion 950, the first coil portion 951 extends parallel to the lower surface of the case portion 950. The second coil portion 952 extends parallel to the aforementioned lower surface of the case portion 950. The third coil portion 953 extends parallel to the aforementioned lower surface of the case portion 950.

A portion of the case portion 950 is disposed between the first coil portion 951 and the second coil portion 952. Another portion of the case portion 950 is disposed between the second coil portion 952 and the third coil portion 953.

The first coil 791 is disposed in the first accommodation space of the core 750 to be rolled around the first coil portion 951, the second coil 792 is disposed in the second accommodation space of the core 750 to be rolled around the second coil portion 952, and the third coil 793 is disposed in the third accommodation space of the core 750 to be rolled around the third coil portion 953.

End portions of the first coil 791 are individually connected to the two first terminals 711a and 711b, respectively, end portions of the second coil 792 are individually connected to the two second terminals 721a and 721b, respectively, and end portions of the third coil 793 are individually connected to the two third terminals 731a and 731b, respectively.

At least two of the first coil 791, the second coil 792, and the third coil 793 may have diameters different from each other. In an exemplary embodiment, as described hereinabove, a smaller diameter coil is rolled around the core 750 more times than a larger diameter coil.

The transformer 662 of FIG. 12 is a multiple output transformer 662 that generates output voltages having different levels from each other through the second coil 792 and the third coil 793, respectively.

Figure 13:
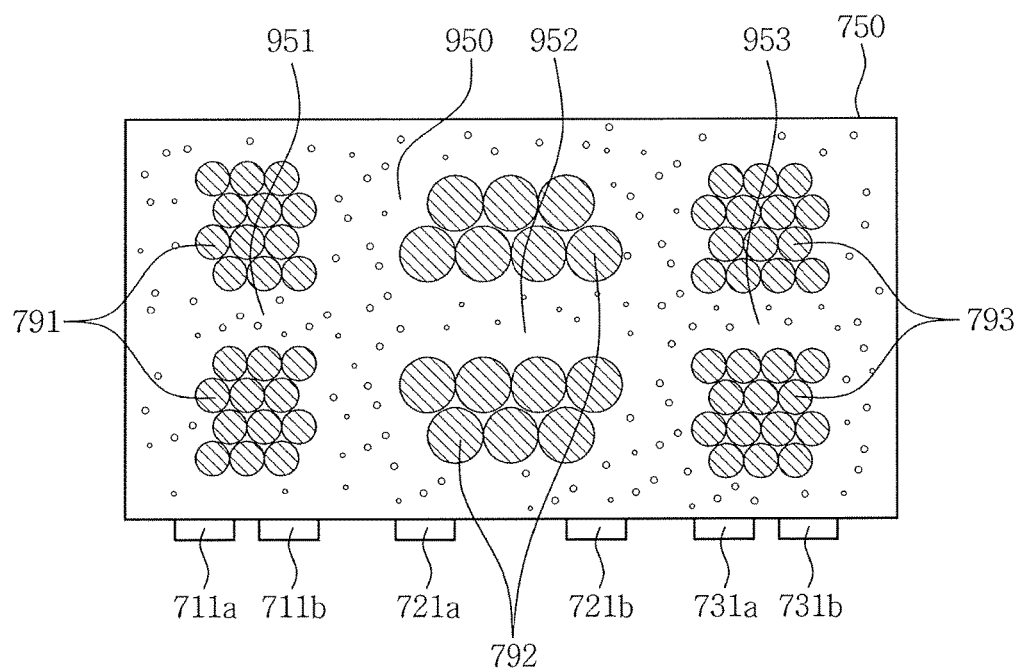
FIG. 13 is a cross-sectional view that illustrates a transformer according to yet another exemplary embodiment.

FIG. 13 is a cross-sectional view illustrating a transformer 662 according to yet another exemplary embodiment.

The transformer 662 of FIG. 13 includes a first coil 791, a second coil 792, a third coil 793, a core 750, first terminals 711*a* and 711*b*, second terminals 721*a* and 721*b*, and third terminals 731*a* and 731*b*.

The first coil 791, the second coil 792, the third coil 793, the core 750, the first terminals 711*a* and 711*b*, the second terminals 721*a* and 721*b*, and the third terminals 731*a* and 731*b* illustrated in FIG. 13 are the same as the first coil 791, the second coil 792, the third coil 793, the core 750, the first terminals 711*a* and 711*b*, the second terminals 721*a* and 721*b*, and the third terminals 731*a* and 731*b* illustrated in FIG. 12, and thus descriptions pertaining thereto will make reference to FIG. 12 and the related descriptions.

However, the first coil 791 of the transformer 662 illustrated in FIG. 13 is disposed between the second coil 792 and the third coil 793, unlike the transformer 662 of FIG. 12.

Figure 14:
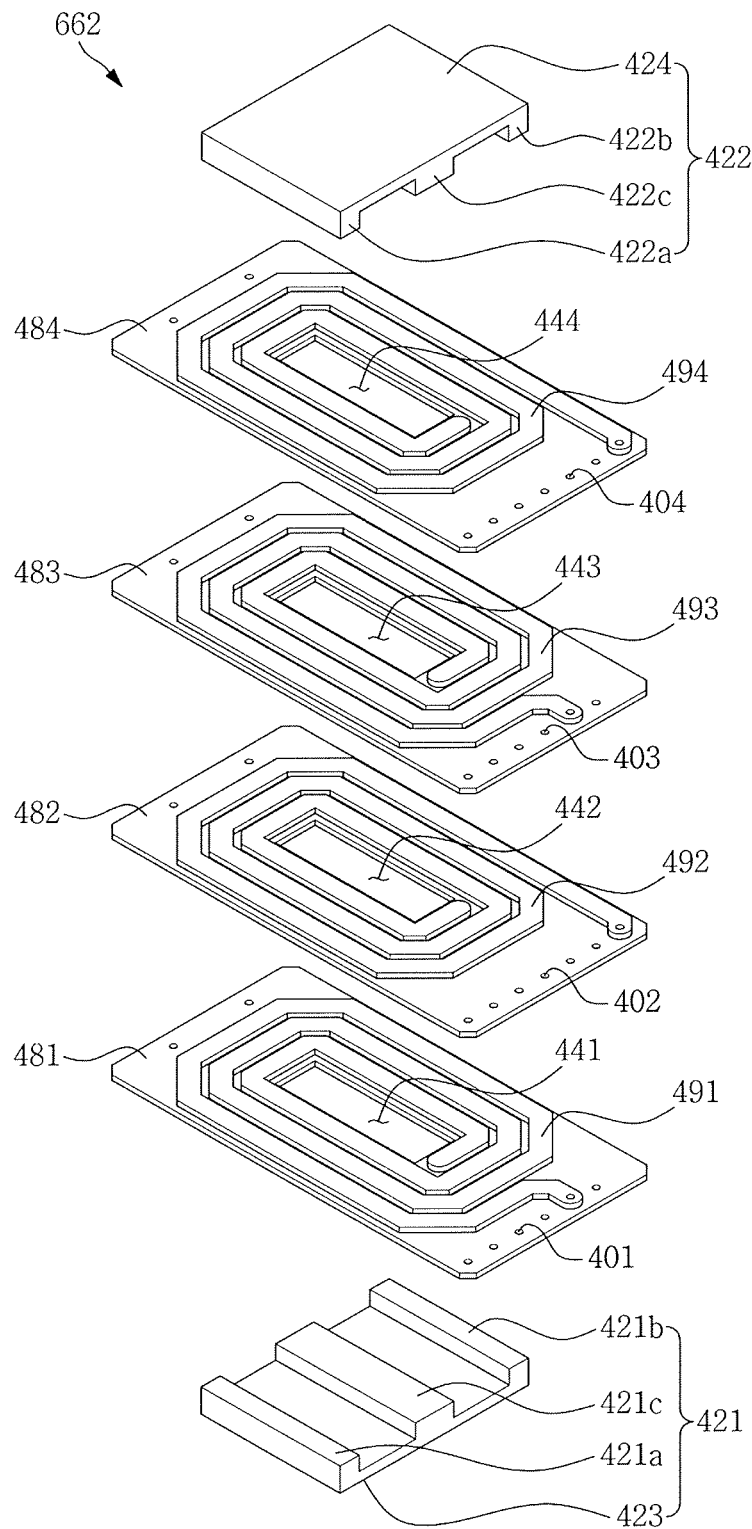
FIG. 14 is an exploded perspective view that illustrates a transformer according to yet another exemplary embodiment.

FIG. 14 is an exploded perspective view illustrating a transformer 662 according to yet another exemplary embodiment.

The transformer 662 illustrated in FIG. 14 is a planar transformer, and includes a first core 421, a second core 422, first, second, third, and fourth substrates 481, 482, 483, and 484, and first, second, third, and fourth coil patterns 491, 492, 493, and 494.

According to an embodiment, the first core 421 includes a case portion 423, a coil portion 421*c*, a first protrusion portion 421*a*, and a second protrusion portion 421*b*. The coil portion 421*c* of the first core 421 is disposed between the first protrusion portion 421*a* and the second protrusion portion 421*b*. The coil portion 421*c*, the first protrusion portion 421*a*, and the second protrusion portion 421*b* of the first core 421 protrude toward the second core 422. The first core 421 may include or be formed of metal. In an exemplary embodiment, the first core 421 includes or is formed of a same material as that forming the aforementioned core 750 of FIG. 8.

According to an embodiment, the second core 422 includes a case portion 424, a coil portion 422*c*, a first protrusion portion 422*a*, and a second protrusion portion 422*b*. The coil portion 422*c* of the second core 422 is disposed between the first protrusion portion 422*a* and the second protrusion portion 422*b*. The coil portion 422*c*, the first protrusion portion 422*a*, and the second protrusion portion 422*b* of the second core 422 protrude toward the first core 421. The second core 422 may include or be formed of a same material as that forming the first core 421. In an exemplary embodiment, the second core 422 includes or is formed of a same material the same as that forming the aforementioned core 750 of FIG. 8.

According to an embodiment, the first core 421 and the second core 422 are unitary, i.e., formed as one unit.

According to an embodiment, the first, second, third, and fourth substrates 481, 482, 483, and 484 are disposed between the first core 421 and the second core 422.

According to an embodiment, the first, second, third, and fourth substrates 481, 482, 483, and 484 surround one of the coil portion 421*c* of the first core 421 and the coil portion 422*c* of the second core 422. To this end, the first, second, third, and fourth substrates 481, 482, 483, and 484 have respective insertion holes 441, 442, 443, and 444, through which the coil portions 421*c* and 422*c* may pass. Through respective insertion holes 441, 442, 443, and 444 of the first, second, third, and fourth substrates 481, 482, 483, and 484, the first core 421 and the second core 422 are connected to each other. In an exemplary embodiment, the coil portion 421*c* of the first core 421 and the coil portion 422*c* of the second core 422 pass through the insertion holes 441, 442, 443, and 444 of the first, second, third, and fourth substrates 481, 482, 483, and 484 to be connected to each other.

According to an embodiment, the first protrusion portion 421*a* of the first core 421 is connected to the first protrusion portion 422*a* of the second core 422, and the second protrusion portion 421*b* of the first core 421 is connected to the second protrusion portion 422*b* of the second core 422.

According to an embodiment, a portion of each of the first, second, third, and fourth substrates 481, 482, 483, and 484 is disposed in an accommodation space defined by the case portion 423, the first protrusion portion 421*a*, the coil portion 421*c*, the case portion 424, the first protrusion portion 422*a*, and the coil portion 422*c*.

According to an embodiment, another portion of each of the first, second, third, and fourth substrates 481, 482, 483, and 484 is disposed in an accommodation space defined by the case portion 423, the coil portion 421*c*, the second protrusion portion 421*b*, the case portion 424, the coil portion 422*c*, and the second protrusion portion 422*b*.

According to an embodiment, the first coil pattern 491 is disposed on the first substrate 481. The first coil pattern 491 surrounds the insertion hole 441 of the first substrate 481. The first coil pattern 491 forms a spiral shape.

According to an embodiment, second coil pattern 492 is disposed on the second substrate 482. The second coil pattern 492 surrounds the insertion hole 442 of the second substrate 482. The second coil pattern 492 forms a spiral shape.

According to an embodiment, the third coil pattern 493 is disposed on the third substrate 483. The third coil pattern 493 surrounds the insertion hole 443 of the third substrate 483. The third coil pattern 493 forms a spiral shape.

According to an embodiment, the fourth coil pattern 494 is disposed on the fourth substrate 484. The fourth coil pattern 494 surrounds the insertion hole 444 of the fourth substrate 484. The fourth coil pattern 494 forms a spiral shape.

According to an embodiment, the first coil pattern 491 is connected to the third coil pattern 493 through a via hole 402 of the second substrate 482 and a via hole 403 of the third substrate 483. The connected first and third coil patterns 491 and 493 correspond to the first coil 791.

According to an embodiment, the second coil pattern 492 is connected to the fourth coil pattern 494 through a via hole 403 of the third substrate 483 and a via hole 404 of the fourth substrate 484. The connected second and fourth coil patterns 492 and 494 correspond to the second coil 792.

A reference numeral 401 illustrated in FIG. 14 refers to a via hole of the first substrate 481.

According to an embodiment, at least one coil pattern has a width different from a width of another coil pattern. In an exemplary embodiment, coil patterns surrounding the first core 421 or the second core 422 a greater number of times have a smaller width than coil patterns surrounding the first core 421 or the second core 422 a lesser number of times.

Figure 15:
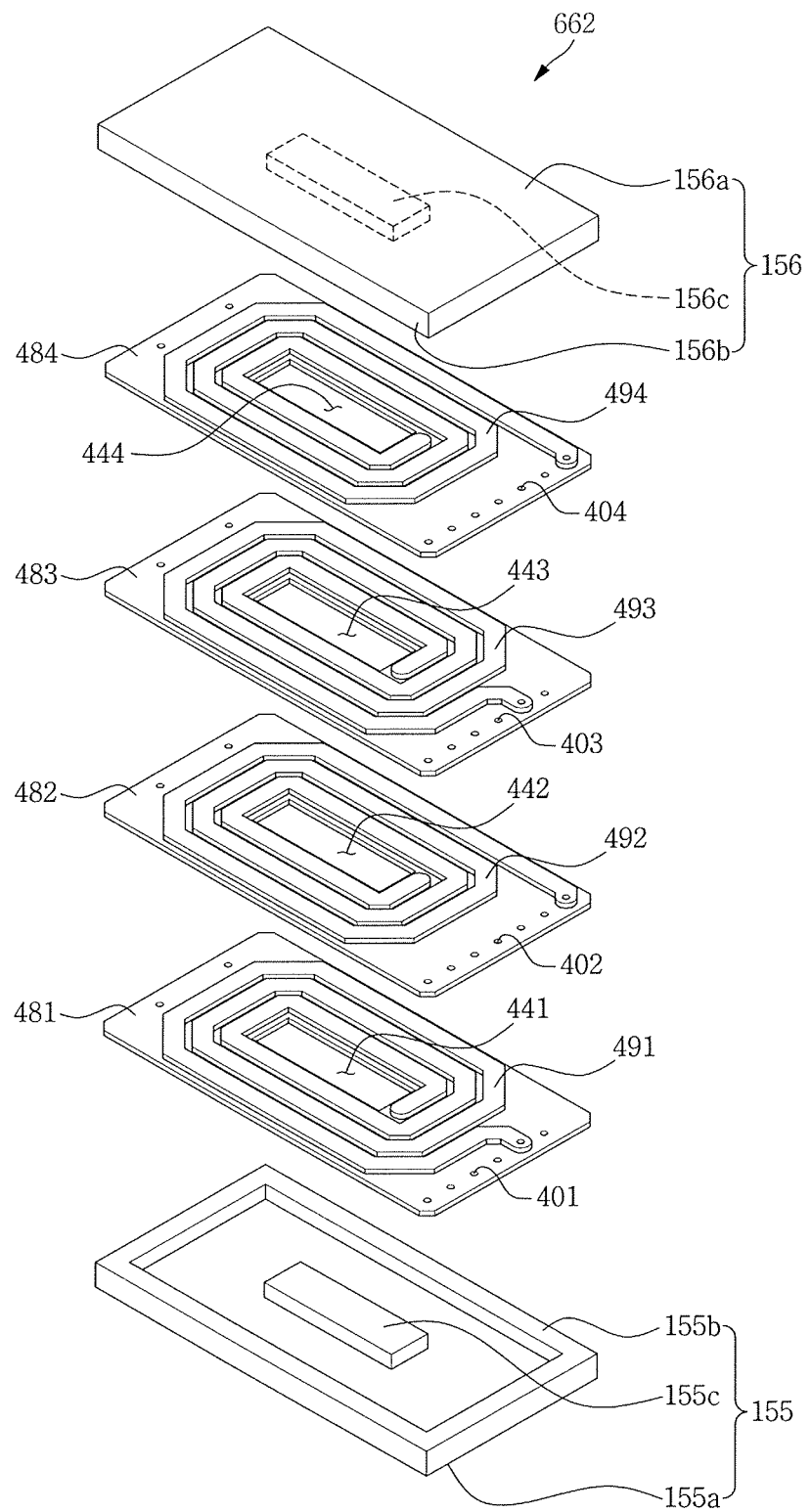
FIG. 15 is an exploded perspective view that illustrates a transformer according to yet another exemplary embodiment.

FIG. 15 is an exploded perspective view that illustrates a transformer 662 according to yet another exemplary embodiment.

The transformer 662 illustrated in FIG. 15 is a planar transformer, and includes a first core 155, a second core 156, first, second, third, and fourth substrates 481, 482, 483, and 484, and first, second, third, and fourth coil patterns 491, 492, 493, and 494.

According to an embodiment, the first, second, third, and fourth substrates 481, 482, 483, and 484, and the first, second, third, and fourth coil patterns 491, 492, 493, and 494 illustrated in FIG. 15 are the same as the first, second, third, and fourth substrates 481, 482, 483, and 484, and the first, second, third, and fourth coil patterns 491, 492, 493, and 494 illustrated in FIG. 14, and thus descriptions pertaining thereto will make reference to FIG. 14 and the related descriptions.

According to an embodiment, the first core 155 and the second core 156 of the transformer 622 illustrated in FIG. 15 surround an entire portion of the first, second, third, and fourth substrates 481, 482, 483, and 484. Each of the first core 155 and the second core 156 may have an area larger than an area of one of the first, second, third, and fourth substrates 481, 482, 483, and 484.

According to an embodiment, the first core 155 includes a case portion 155a, a coil portion 155c, and a protrusion portion 155b. The coil portion 155c of the first core 155 is disposed at a center portion of the case portion 155a. The protrusion portion 155b of the first core 155 is disposed at an edge portion of the case portion 155a, and surrounds the coil portion 155c. The coil portion 155c and the protrusion portion 155b of the first core 155 protrude toward the second core 156. The first core 155 includes or is formed of a metal. In an exemplary embodiment, the first core 155 includes or is formed of a same material as that forming the aforementioned core 750 of FIG. 8.

According to an embodiment, the second core 156 includes a case portion 156a, a coil portion 156c, and a protrusion portion 156b. The coil portion 156c of the second core 156 is disposed at a center portion of the case portion 156a. The protrusion portion 156b of the second core 156 is disposed at an edge portion of the case portion 156a, and surrounds the coil portion 156c. The coil portion 156c and the protrusion portion 156b of the second core 156 protrude toward the first core 155. The second core 156 includes or is formed of a metal. In an exemplary embodiment, the second core 156 includes or is formed of a same material as that forming the aforementioned core 750 of FIG. 8.

According to an embodiment, the first core 155 and the second core 156 are unitary, i.e., formed as one unit.

According to an embodiment, the coil portion 155c of the first core 155 and the coil portion 156c of the second core 156 pass through the insertion holes 441, 442, 443, and 444 of the first, second, third, and fourth substrates 481, 482, 483, and 484 to be connected to each other.

According to an embodiment, the protrusion portion 155b of the first core 155 is connected to the protrusion portion 156b of the second core 156.

According to an embodiment, the first, second, third, and fourth substrates 481, 482, 483, and 484 are disposed in an accommodation space defined by the first core 155 and the second core 156.

According to embodiments, the transformer 662 of FIG. 14 or the transformer 662 of FIG. 15 can be manufactured in the following manner.

First, the first, second, third, and fourth substrates 481, 482, 483, and 484 are prepared. In such an exemplary embodiment, the first coil pattern 491 of the first substrate 481 and the third coil pattern 493 of the third substrate 483 are connected to each other, and the second coil pattern 492 of the second substrate 482 and the fourth coil pattern 494 of the fourth substrate 484 are connected to each other.

Subsequently, the first, second, third, and fourth substrates 481, 482, 483, and 484 are disposed in a mold.

Subsequently, metal powders 111 are filled into the mold in which the first, second, third, and fourth substrates 481, 482, 483, and 484 are disposed. In an exemplary embodiment, the metal powder 111 includes metal particles 112 that include the aforementioned iron and an insulator 113 surrounding the metal particles 112, for example.

Subsequently, pressure and heat are applied to the metal powders 111 in the mold. In such an exemplary embodiment, the metal powders 111 combine to each other to coagulate. The coagulated metal powders 111 form the first core 421 and the second core 422, including the first protrusion portions 421a and 421b, the coil portions 421c and 422c, and the second protrusion portions 421b and 422b.

The first core 421 and the second core 422 surround a portion of the first, second, third, and fourth substrates 481, 482, 483, and 484 or an entire portion thereof, in the transformer 662 manufactured as described hereinabove. Accordingly, a coupling force between the first, second, third, and fourth substrates 481, 482, 483, and 484 and the core 750 may increase, and thus an additional supporting member for supporting the first, second, third, and fourth substrates 481, 482, 483, and 484 and the core 750 is unnecessary.

In an exemplary embodiment, at least one of the transformers 662 illustrated in FIGS. 7, 11, 12, 13, 14, and 15 can be applied to a common planar display device along with a curved display device.

As set forth hereinabove, a backlight unit according to exemplary embodiments may provide the following effects.

First, a transformer of a backlight unit according to exemplary embodiments has a core that includes a metal such as iron. Such a transformer can generate a higher level voltage than a transformer with a ferrite core. Accordingly, when a transformer that includes a metal-containing core is utilized in a backlight unit, the number of required light source strings can be decreased, and thereby a width of a light-source circuit board may decrease. As a result, a size of the backlight unit may be reduced.

Second, the core of a transformer according to exemplary embodiments includes metal powders. The core surrounds an entire portion of a coil. Accordingly, a coupling force between the coils and the core increases, and thereby an additional supporting member for supporting the coils and the core is unnecessary.

Third, a coil included in a transformer according to exemplary embodiments has a smaller diameter and can be rolled around the core more times. Accordingly, even though the number of times the coil is rolled around the core increases, a size increase of the transformer can be minimized.

From the foregoing, it will be appreciated that various exemplary embodiments in accordance with embodiments of the present disclosure have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:
1. A backlight unit comprising:
a light source; and a light-source driving unit configured to drive the light source and that includes a transformer, wherein the transformer comprises:

a core comprising a plurality of metal powders and a case portion; and a plurality of coils embedded in the core, wherein at least one coil has a diameter different from a diameter of another coil, and the plurality of coils is fully enclosed by the case portion.

2. The backlight unit of claim 1, wherein at least one metal powder comprises metal particles and an insulator surrounding the metal particles.

3. The backlight unit of claim 1, wherein at least one metal powder comprises at least one of iron, cobalt, and nickel.

4. The backlight unit of claim 1, wherein the core surrounds the plurality of coils, the case portion surrounds the plurality of coils, and the core further comprises: a coil portion around which each of the plurality of coils is rolled.

5. The backlight unit of claim 4, wherein the coil portion and the case portion are formed as one unit.

6. The backlight unit of claim 1, wherein a plurality of coils with a smaller diameter is rolled around the core more times than a plurality of coils with a larger diameter.

7. A backlight unit comprising:

a light source; and a light-source driving unit configured to drive the light source and that includes a transformer, wherein the transformer comprises:

a core comprising a plurality of metal powders and a case portion;

a plurality of substrates, each having an insertion hole into which the core is inserted; and a plurality of coil patterns on respective substrates of the plurality of substrates, each coil pattern surrounding the core, wherein at least one coil pattern has a width different from a width of another coil pattern, and the plurality of coils is fully enclosed by the case portion.

8. The backlight unit of claim 7, wherein at least one metal powder comprises metal particles and an insulator surrounding the metal particles.

9. The backlight unit of claim 7, wherein at least one metal powder comprises at least one of iron, cobalt, and nickel.

10. The backlight unit of claim 8, wherein the core surrounds the plurality of substrates, the case portion surrounds the plurality of substrates, and the core further comprises: a coil portion that is inserted into the insertion holes of the plurality of substrates.

11. The backlight unit of claim 10, wherein the coil portion and the case portion are formed as one unit.

12. The backlight unit of claim 8, wherein a plurality of coil patterns with a smaller width is rolled around the core more times than a plurality of coils with a larger width.

13. A light-source driving unit for driving a light source, comprising:

a transformer, wherein the transformer comprises:

a core comprising a plurality of metal powders and a case portion; and a plurality of coils that surround the core, wherein at least one coil has a characteristic dimension different from a characteristic dimension of another coil, and at least one metal powder comprises at least one of iron, cobalt, and nickel, wherein a plurality of coils with a smaller characteristic dimension is rolled around the core more times than a plurality of coils with a larger characteristic dimension, and the case portion fully encloses the plurality of coils.

14. The light-source driving unit of claim 13, fluffier comprising:

a plurality of substrates, each having an insertion hole into which the core is inserted, wherein each of the plurality of coil patterns is disposed on a respective substrate of the plurality of substrates, and the characteristic dimension of a coil is a width.

15. The backlight unit of claim 14, wherein the core surrounds the plurality of coils, the case portion surrounds the plurality of coils, and the core further comprises: a coil portion around which each of the plurality of coils is rolled.

16. The light-source driving unit of claim 13, wherein each of the plurality of coils is embedded in the core, and the characteristic dimension of a coil is a diameter.

17. The backlight unit of claim 16, wherein the core surrounds the plurality of substrates, the case portion surrounds the plurality of substrates, and the core further comprises: a coil portion that is inserted into the insertion holes of the plurality of substrates.

18. The light-source driving unit of claim 13, wherein at least one metal powder comprises metal particles and an insulator surrounding the metal particles, and the metal particles comprise at least one of iron, cobalt, and nickel.

19. The light-source driving unit of claim 13, wherein the plurality of coils surrounds different portions of the core.

* * * * *